Aug. 13, 1963  M. A. HALVERSON ETAL  3,100,578
RIVET GUNS
Filed April 24, 1961

INVENTORS
MILTON A. HALVERSON
BY GLENN V. OLSON

Moore, White & Burd
ATTORNEYS

United States Patent Office 3,100,578
Patented Aug. 13, 1963

3,100,578
RIVET GUNS
Milton A. Halverson, 1947 Flandrau, and Glenn V. Olson, 1220 Bradley, both of St. Paul Minn.
Filed Apr. 24, 1961, Ser. No. 104,880
5 Claims. (Cl. 218—42)

This invention relates to new and useful improvements in rivet guns of the general type wherein the rivet is inserted into the work and secured therein from the same side of the work.

An important object of the present invention is to provide a rivet gun of the class described capable of handling rivets of slightly varying sizes or diameters.

A further object of the invention is to provide a rivet gun which may be conveniently manipulated with one hand.

A further object of the invention is to provide a rivet gun comprising a relatively small nozzle having a restricted bore therein for receiving the usual rivet-supporting mandrel, when preparing the tool for a riveting operation, said nozzle permitting the nozzle to be readily inserted into confined or restricted areas.

A further and more specific object of the invention is to provide a rivet gun of the class described comprising a body provided at one end with a relatively small nozzle having an axial bore therein for receiving the shank or mandrel of an elongated rivet-supporting member, having a head at one end for initially supporting a tubular rivet thereon in position to be inserted into or through an aperture in a workpiece, and whereby when the operating handle of the gun is subsequently actuated, the tubular body of the rivet is expanded into engagement with the walls of the aperture, and its ends are firmly crimped or compressed against the opposite sides of the workpiece, continued manipulation of the operating handle causing the head of the rivet-supporting member to snap off and thereby free the rivet gun or tool from the workpiece.

Other objects of the invention reside in the means provided within the body of the rivet gun for guiding the detached mandrel of the rivet-supporting member through said body after its head has been decapitated; in the simple and inexpensive construction of the composite rivet gun whereby it may be manufactured at low cost; in the means provided for permitting free and automatic discharge of the headless mandrel from the rivet gun at the conclusion of each riveting operation; and in the unique design and construction of the composite rivet gun whereby it may readily and conveniently be manipulated with one hand and does not require to be calked or pre-set for each riveting operation.

These and other objects of the invention and the means for their attainment will be more apparent from the following description taken in connection with the accompanying drawing.

In the accompanying drawing there has been disclosed a structure designed to carry out the various objects of the invention, but it is to be understood that the invention is not confined to the exact features shown, as various changes may be made within the scope of the claims which follow.

Figure 1:
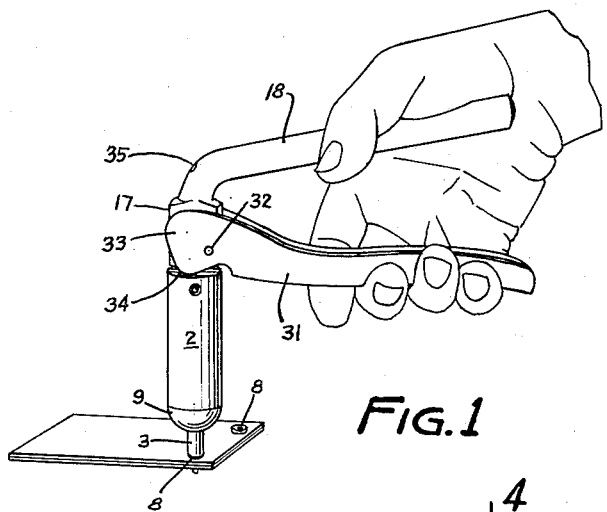
FIGURE 1 is a view in perspective showing the tool applied to a workpiece.

The novel rivet gun herein disclosed is shown comprising a hollow body 2 having a reduced nozzle 3 detachably secured to one end by suitable threads 4. Nozzle 3 has a restricted bore 5 therein for receiving a nail-like rivet-supporting mandrel 6, having a head 7 at one end and having its upper end pointed to facilitate inserting it into the restricted bore 5 of the nozzle 3, when positioning a hollow rivet 8 in the tool, as will be understood by reference to FIGURE 2. The lower end of the body 2 is normally closed by a detachable cap 9, received in threaded engagement with the threads 4.

The hollow body 2 has an enlarged bore 11 therein extending upwardly from the lower threaded end portion thereof and terminating at its upper end in an annular shoulder 12 against which one end of a suitable spring 13 is seated. The opposite end of spring 13 is seated against the upper end portion of a cup-shaped member 14 having an enlarged threaded bore 15 at its upper end portion adapted to be received in threaded engagement with the lower end portion of a tubular member 16. The upper end of member 16 is fixedly secured to a block-like member 17 forming a part of a fixed handle 18, as clearly illustrated in the drawing.

The lower reduced end portion 14′ of member 14 is normally received in a bore 10 in the cap 9. Member 14 has an axial bore 19 therein the lower portion of which is tapered, as shown at 21 in FIGURE 3. A pair of tapered jaws 22 are fitted into the tapered bore 19 of the member 14, and cooperate to grip the shank or mandrel 6 of the nail-like rivet-supporting member, when the parts are positioned as shown in FIGURES 3 and 4.

A relatively smaller spring 23 is shown mounted within the bore of the tubular member 16 of the fixed handle 18, and has its lower end seated against the upper end of a jaw actuating member 24 the lower end of which is seated against the jaws 22, as clearly shown in the drawing. The upper end of spring 23 is seated against the inner end portions of a pair of tubular studs 25 secured in axial alignment in suitable apertures provided in the upper wall portion of the tubular body 2, as best shown in FIGURE 4. The inner ends of studs 25 are spaced apart to receive therebetween an elongated tubular member 27 which serves to provide a guideway for directing the scrap mandrels 6 from the tool body at the end of each cycle of operation, after their heads 7 have been snapped off by actuation of the movable handle, as will subsequently be described. The tubular studs 25 are longitudinally split and are so sized that they are frictionally retained in their respective apertures in the body 2, as will be understood. The inner end portions of studs 25 are received in elongated apertures or slots 26 provided in the wall of the tubular member 16, thereby to permit relative axial movement between body 2 and member 16.

Figure 4:
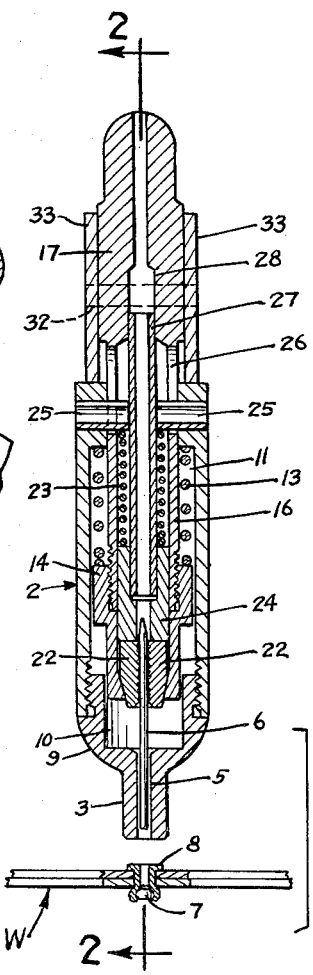
FIGURE 4 is a vertical sectional view on the line 4—4 of FIGURE 3, with the handle of the rivet gun manipulated to separate the rivet-supporting mandrel from its head, to free the rivet gun from the workpiece.
Figures 2, 3:
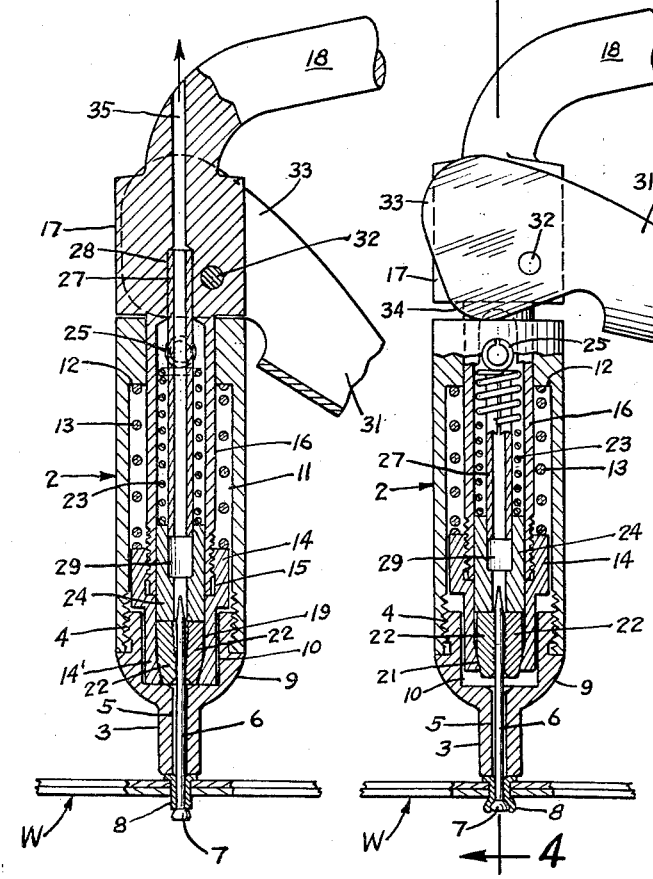
FIGURE 2 is a sectional elevation on the line 2—2 of FIGURE 4, showing the rivet gun applied to a workpiece with the rivet inserted through an aperture provided therein.
FIGURE 3 is a sectional elevation similar to FIGURE 2, showing the rivet expanded and the head of the rivet-supporting mandrel about to be snapped off.

The upper end portion of the tubular member 27 is received in a bore 28 provided in handle block 17, and its lower end is received in a suitable bore 29 provided in the upper end of the jaw actuating member 24, as clearly illustrated in FIGURES 2, 3 and 4.

The inner smaller spring 23 constantly urges the jaw operating member 24 downwardly in a direction towards the tapered bore 21 of member 14, and the relatively larger spring 13 serves to return the pivoted handle 31 to its normal inoperative position. See FIGURE 2.

Handle 31 is pivotally mounted on a pivot pin 32 secured in the block-like member 17 of the fixed handle 18. It is shown formed of sheet metal, and is preferably of U-shaped cross-section whereby its enlarged bifurcated end portion 33 may straddle the block-like member 17 of the fixed handle 18.

The bifurcated end portion 33 of the pivoted handle 31 is provided with cam surfaces 34 adapted to engage the upper end of the elongated body 2, when the two handles are squeezed together, as shown in FIGURE 1. Such actuation of the handles 18 and 31 causes the block-like member 17 and the tubular member 16 to move upwardly in the tubular body 2, whereby the jaws 22 are actuated by the tapered bore 21 in the lower end of member 16 to firmly grip the shank or mandrel 6 and exert an upward pull thereon. Such upward pull on the mandrel will cause complete expansion and compression of the tubular rivet in the workpiece, as shown in FIGURES 3 and 4, after which the head 7 of the mandrel is finally snapped off, as shown in FIGURE 4, and may remain in the tubular rivet as a part thereof.

The novel rivet gun herein disclosed is extremely simple and inexpensive in construction. It is simple to manipulate, and does not require the handle 31 to be calked or otherwise manipulated before each riveting operation; as handle 31 is always returned to its normal inoperative position by spring 13, after each cycle of operation, as shown in FIGURE 2. Thus the tool may readily be operated by an inexperienced mechanic.

In "loading" the rivet gun, the nail-like mandrel 6 is inserted through a tubular rivet and into the restricted bore 5 in the nozzle 3, as will be understood by reference to FIGURE 2. The movable handle 31 is then manipulated until the jaws 22 grip the mandrel 6 and draws the same into the nozzle 3 until the flanged end of the rivet is seated against the end of the nozzle. The rivet may then be inserted through an aperture in the workpiece W, after which the operator further squeezes the handles 18 and 31, together until the tubular body of the rivet is expanded and its ends crimped or upset, as shown in FIGURES 3 and 4, thereby to securely fasten together the elements to be secured together by the rivet, as best shown in FIGURE 4. In the final operation of squeezing the handles, the head 7 is snapped off the mandrel, and the job is completed.

The headless shank or mandrel 6 may then pass through the guide member 27 and through an aperture 35 in handle block 17 to the atmosphere, as waste, and as indicated by the arrow in FIGURE 2.

The novel rivet gun herein disclosed is particularly suitable for "blind" riveting. It has found a ready market in automobile body repair shops, as it greatly facilitates the job of applying new "rocker panels" to vehicle bodies, when the original panels have become defective as a result of early deterioration from the effects of salts and other chemicals used in many sections of the country for disintegrating sleet and ice from city streets, and to which the "rocker panels" may be frequently exposed at certain seasons of the year. It makes it possible to eliminate many welding jobs, and replaces sheet metal screws, bolts and nuts, and makes it possible to get into many confined areas which may be extremely difficult to get at with conventional tools. The rivets when secured in the workpiece as shown in FIGURE 4, cannot vibrate loose. Also because of the unique construction of the composite tool, it is not likely to jam, even when used with mandrels of slightly varying diameters.

It is apparent that many modifications and variations of the invention as hereinbefore set forth may be made without departing from the spirit and scope thereof. The specific embodiments described are given by way of example only and the invention is limited only by the terms of the appended claims.

We claim as our invention:

1. In a tool of the class described, a hollow body having an enlarged bore therein, a nozzle secured to one end of said bore and having a restricted bore axially aligned with said enlarged bore, said restricted bore being adapted to receive the headless end of a mandrel having an enlarged head at its opposite end for engaging the headless end of a hollow rivet supported on said mandrel, means in the enlarged bore in said body for gripping the mandrel, a handle member having a tubular extension extending into said enlarged bore and engaged with said mandrel gripping means, and a second handle member pivoted to said first handle member, and a cam element on said second handle member engageable with said hollow body for causing relative axial movement of said tubular element in said enlarged bore, when said handle members are actuated, thereby to draw the mandrel into the nozzle to cause the head on said mandrel to expand the walls of the hollow rivet into firm engagement with a workpiece and continued operation of the handle members when the rivet has been completely expanded and upset will cause the head of the mandrel to be snapped off, thereby to free the tool from the work, and a longitudinal channel through said hollow body and within said tubular extension through which the headless portion of the mandrel may pass to the atmosphere upon completion of the riveting cycle.

2. In a tool of the class described, a hollow body having an enlarged bore therein terminating at one end in a reduced bore, a nozzle secured to the opposite end of said bore and having a restricted bore axially aligned with said enlarged bore, said restricted bore being adapted to receive the headless end of a mandrel having an enlarged head at its opposite end for engaging the headless end of a hollow rivet supported on the mandrel, co-acting jaws in said hollow body, an elongated tubular member mounted within said enlarged bore for relative axial movement therein, means at the inner end of said tubular member for supporting said jaws and having a tapered bore therein, a handle member secured to the opposite end of said elongated tubular member, a second handle member pivoted to said first handle member and having cam means thereon for causing relative axial movement of said tubular element in said enlarged bore, when said handle members are actuated, relative axial movement of said tubular member by manipulation of said handle members causing the jaws to grip the mandrel and draw the mandrel into the nozzle whereby the head of the mandrel will expand the walls of the hollow rivet and firmly secure the rivet in a workpiece and continued operation of the handle members when the rivet has been completely expanded and upset will cause the head of the mandrel to be snapped off, thereby to free the tool from the work, and a longitudinal channel through said hollow body and within said elongated tubular member through which the headless portion of the mandrel may pass to the atmosphere upon completion of the riveting cycle.

3. In a tool of the class described, a hollow body having an enlarged bore therein terminating at one end in a reduced bore, a nozzle secured to the opposite end of said body and having a restricted bore axially aligned with said enlarged bore, said restricted bore being adapted to receive the headless end of a mandrel having an enlarged head at the opposite end for engaging the headless end of a hollow rivet supported on said mandrel, a handle member having an elongated tubular extension at one end receivable in the reduced bore in said hollow body, an element secured to the inner end of said elongated tubular member for direct movement therewith, said element having a tapered bore therein, a pair of tapered jaws received in said tapered bore and adapted to engage a mandrel when inserted through the restricted bore in said nozzle, a second handle member pivoted to said first handle member and having cam means thereon engageable with means on said hollow body to cause relative axial movement of said elongated tubular extension within said hollow body, when said pivoted handle is actuated, such relative axial movement of said tubular extension causing said jaws to grippingly engage the mandrel and draw it into the nozzle, whereby the enlarged head on the mandrel will expand and compress the rivet in the workpiece and thereafter snap off, and an elongated hollow guide member within said elongated tubular member for receiving and guiding the headless portion of the mandrel through the hollow body of the tool to the atmosphere when the handles have been actuated to secure the rivet in the workpiece.

4. In a tool according to claim 3, wherein dual springs are provided within said hollow body, one for constantly urging the jaws into their normal non-gripping positions, and the other for normally retaining the handle members in jaw releasing positions.

5. In a tool according to claim 3, wherein said elongated hollow guide member is floatingly supported within the tool body.

References Cited in the file of this patent

UNITED STATES PATENTS

| | | |
|---|---|---|
| 1,102,937 | Malaby | July 7, 1914 |
| 2,384,434 | Bettington | Sept. 11, 1945 |
| 2,384,690 | Mullgardt | Sept. 11, 1945 |
| 2,527,307 | Huck | Oct. 24, 1950 |
| 2,582,248 | Gookin | Jan. 15, 1952 |

FOREIGN PATENTS

| | | |
|---|---|---|
| 699,044 | France | Dec. 8, 1930 |